//  // 
United States Patent [19]

Schanze

[11] Patent Number: 4,540,594

[45] Date of Patent: Sep. 10, 1985

[54] METHOD OF PRODUCING A BIOLOGICALLY HIGH QUALITY NATURAL FOOD CONCENTRATE, THE PRODUCT OBTAINED AND ITS USE

[76] Inventor: Rudolf Schanze, Landsberger Str. 9, D-8034 Germering, Fed. Rep. of Germany

[21] Appl. No.: 470,133

[22] Filed: Feb. 28, 1983

[30] Foreign Application Priority Data

Mar. 2, 1982 [DE] Fed. Rep. of Germany ....... 3207505

[51] Int. Cl.³ ............................. A23L 1/08; A23L 1/30
[52] U.S. Cl. ....................................... 426/74; 126/613; 126/658
[58] Field of Search ................. 426/613, 800, 74, 801, 426/658, 810

[56] References Cited

U.S. PATENT DOCUMENTS

| | | | |
|---|---|---|---|
| 3,351,472 | 11/1967 | Finley et al. | 426/658 X |
| 3,514,298 | 5/1970 | Noznick et al. | 426/613 X |
| 3,851,070 | 11/1974 | Sessoms et al. | 426/613 X |
| 4,220,666 | 9/1980 | Fields | 426/658 X |
| 4,273,794 | 6/1981 | von Stering-Krugheim | 426/658 X |
| 4,426,397 | 1/1984 | Schanze | 426/613 X |

Primary Examiner—Robert Yoncoskie
Attorney, Agent, or Firm—Ostrolenk, Faber, Gerb & Soffen

[57] ABSTRACT

The invention relates to a method of preparing a biologically high-grade natural food concentrate, characterized by mixing honey or honey mixed with other bee products, a high-grade protein product or a mixture of high-grade protein products, mineral substances and possibly roughage substances and/or carbohydrates with each other in such a manner as to obtain at least 40 wt % honey, referred to the final product, in the final product obtained.

The invention also provides a method of producing a biologically high-grade natural food concentrate, characterized by admixing honey or honey mixed with other bee products, a high-grade protein product or a mixture of high-grade protein products, a vegetable fat product or a mixture of vegetable fat products, and possibly mineral additions with each other in such a manner that at least 40 wt % honey referred to the final product, is contained in the resultant final product.

18 Claims, No Drawings

METHOD OF PRODUCING A BIOLOGICALLY HIGH QUALITY NATURAL FOOD CONCENTRATE, THE PRODUCT OBTAINED AND ITS USE

The present invention relates to a method of producing a biologically high quality natural food concentrate, the product obtained by this method and it use. An unusual change in trend can be noted in human nutrition in industrialized countries having a surplus supply of foodstuffs. At present the general diet is characterized by an over-consumption of protein and energy. Foodstuffs are treated in such a manner that their natural accompanying substances are removed. Grains are reduced to their carbohydrate portions, protein products to the muscle-meat portions in the case of animal protein or to the protein fractions in the case of vegetable protein substances. The by-products obtained upon the preparation of foodstuffs are discarded although they contain the roughage and mineral and trace substances as well as many vitamins which are urgently necessary for a balanced coverage of the needs of man.

As a result of this widespread over-supply, metabolic wastes are produced within the human body which, in the absence of mineral and trace substances, cannot be excreted in the form of soluble salts. They are converted by the body into by-products and remain in the different organs. The lack of bulk in the food also leads to disturbances in digestion and in the entire body. The relationship between this form of a no-longer natural diet which goes beyond what is required and the diseases of modern civilization are being recognized and discussed as can be noted to a greater and greater extent within specialized circles.

In order to eliminate metabolic surpluses in the form of excretable substances, particularly substances eliminated in the urine, a sufficient supply of minerals for the formation of soluble salts must always be assured. The hormonal and enzymatic control of such degradation processes is furthermore regulated by certain amino acids, particularly essential amino acids, and beneficial microelements (trace elements). The protein provides the base for the enzyme body and the trace element provides the basis for the activation of the enzyme. Only the presence of both groups of substances in the diet assures the possibility of a correct response by the body to surpluses and the demands resulting therefrom.

Reports on the increase in coronary and ischemic heart diseases, rheumatic syndromes, disturbances of vision in the form of glaucoma and cataracts are also indications that the basic diet suffers from critical imbalances. In the foreground in the field of disturbance and cause, is the lack of bulk, minerals, vitamins, trace substances and, in part, essential amino and fatty acids.

On other occasions, particularly in the case of high-performance athletes or patients or upon physical or mental stress, a supply of carbohydrates is frequently not assured. High-performance athletes or persons who are particularly under stress, for instance, take glucose in order to restore their energy. However, upon ingestion of carbohydrates the body requires essential amino and fatty acids, electrolytes, etc., for the conversion of the carbohydrates. While glucose supplies energy, it at the same time results in a loss and a deficit of other essential components of the diet.

On the other hand, modern food technology has developed processes and methods which make it possible to have recourse to particularly high-quality substances and to provide building blocks on basis of which it would be possible to take steps to prevent the damage which is being experienced due to civilization and to cover momentary needs as in the case of high-energy sports, etc.

The application of science to human physiology and medical and diet-caused conditions has made deeper insight possible into conditions such as occur also as a phenomenon of civilization in every-day life, in athletics, in illness, in old age and in youth. There are numerous substances which are particularly well-suited for human nutrition.

Milk protein consists essentially of a mixture of micellar casein and spherical serum protein. In 100% milk total protein, there are roughly 80% casein, 15% albumin fractions, 4% globulin fractions and 1% non-protein nitrogen. The caseins can be removed in the process of coagulation, cheese-making, so that—depending on the industrial process—whey or serum protein remains. By means of ultra-filtration or membrane filtration, the serum protein can be separated from the non-protein nitrogen. A retentate is obtained which contains the highest-quality protein known up to the present time. Its biological value is 138, compared with egg albumin (100) and with casein whose biological value is between 70 and 80 (for biological value, see the book "Milch und Milchprodukte in der Ernahrung" [Milk and Milk Products in Nutrition], by E. Renner (Giessen University), 1975, first edition, published by Volksw. Verlag GmbH of Kempten and Verlag Th. Mann of Hildesheim). The biological value (BV) is defined as the grams of body protein which can be replaced by 100 g of the food protein in adults, the BV of whole-egg protein being taken as reference value equal to 100.

As can be noted from the following table taken from the above-mentioned book, milk protein has a BV of about 92 which is only slightly below that of egg protein. Between casein and lactalbumin there is a clear difference, the equivalent value of lactalbumin being even higher than that of whole egg protein since in order to cover the daily requirement of essential amino acids, 17.4 g of egg protein are necessary but only 14.5 g of lactalbumin are required. A total of 28.4 g of cow's milk protein are necessary. Lactalbumin thus contributes essentially to the high BV of the milk protein.

TABLE

| Food Protein | BV |
| --- | --- |
| Whole egg | 100 |
| Cow's milk | 92 |
| Casein | 73 |
| Lactalbumin | 104 |
| Beef | 78 |
| Potatoes | 69 |
| Peanuts | 60 |
| Wheat flour | 45 |

High-grade protein can be utilized in the human body practically without loss and is therefore particularly suitable for the prevention of protein deficiencies and impairments. To be sure, such protein is highly sensitive, particularly to the effect of temperature. In actual use, it should not lose its high natural value.

Honey represents, essentially, a mixture of carbohydrates, particularly monosaccharides. However, honey is more than the sum of its sugars since it is enriched by the living process of working fermentation via the bee with a palette of highly effective biologically valuable vital substances which make it particularly valuable for humans. The extensive popular and scientific literature on this is assumed to be known. To be sure, honey is also highly sensitive and must be treated very carefully if it is not to lose its high natural value. Therefore, there are a number of statutory requirements with regard to honey in order to assure that its natural quality reaches the consumer unchanged. Among such requirements, the proportion of water in the honey assumes an important position since it is known that honey containing more than 17% water is subject to fermentation and putrefaction if temperature, storage for a period of time and contamination with suitable fermentation yeasts create the prerequisites for this. The German Beekeepers Association therefore has stipulated for honey (with the exception of heater honey), a maximum water content of 21%. Within this concentration, which thus corresponds to at least 79% solids in the honey, the natural preservation is sufficient to keep the honey stable and vital for years (for literature with regard to honey, see, inter alia, "The Beekeeper's Handbook," Owen Meyer, 1981, Thorson's Publishers Ltd., Wellington, Nothamptonshite, Great Britain; "The Hive and the Honey Bee," Roy A. Grout, 1963, 5th revised edition, Dadant & Sons, Hamilton, Ill., USA; Handbuch der Bienenkunde, Volume 6, "Der Honig" [Honey], E. Zander, A. Koch, Anna Maurizio, 1975, Verlag Eugen Ulmer, Stuttgart).

Vegetable fats and particularly vegetable oils are very valuable for human nutrition. Thus, for example sunflower oil is one of the most valuable oils for human nutrition, in addition to fresh linseed oil and safflower oil. Linseed oil, however, has the disadvantage that it scarcely keeps and safflower oil cannot always be reliably obtained. Its value lies in the extremely high content of essential fatty acids which, on the one hand, can prevent fat compounds, for instance cholesterol, from depositing in the vessels as a result of overburdened metabolism or else assist in naturally mitigating physical impairment produced by excess of fat. It is excellently adapted to absorb fat-soluble vitamins such as vitamins A, D, E and K and hold them available for the body and to form very fine emulsions in combination with natural lecithin from vegetable fats. Accompanied by corresponding protein and carbohydrates, it affords a basis of selection for a biologically high-grade diet. Sunflower oil also must be treated carefully.

It has been attempted on various occasions to vary the above-mentioned nutrient agents in order to convert them into stabler forms or combine them with each other.

In West German Unexamined Application for Patent No. 16 92 782, a method is described of producing a dry honey-milk product in which a mixture of honey, a dry-milk product and water are mixed and the mixture is dried. Instead of the dry-milk product and water, one can also use fresh milk products, for instance whole milk, skimmed milk, buttermilk or whey. In this known method, one obtains a product which is in powder form and contains 10 to 75 parts of honey solids to about 90 to 25 parts of milk solids. It is essential in this process that the water content prior to drying be more than 90%. In most of the examples, the drying is effected by freeze-drying. It is, however, stated that other methods of drying can also be used. This method has the disadvantage that in order to convert the honey into a powder product large amounts of energy are necessary since solutions having a water content of more than 90% must be concentrated and dried. This method is therefore disadvantageous from an industrial standpoint. Freeze-drying furthermore requires extensive apparatus and this method is therefore unsuitable for the industrial large-scale production of powdered honey products.

In West German Provisional Patent AS No. 10 03 560, a method is described of producing honey products in which a solution of gelatinized starch is mixed with honey, the mixture is set aside at about 45° C. for degradation of the starch and then, after addition of citric acid, cooled and concentrated in vacuum. In accordance with one specific embodiment, milk or dry-milk powder is added to the product consisting of honey and starch. The product obtained by this method has the disadvantage that its shelf life is limited.

West German Unexamined Application for Patent OS No. 29 19 059 describes a method of producing powdered honey products in which honey is mixed with buttermilk powder.

In West German Unexamined Application for Patent No. 29 19 059, it is shown that even in the case of small amounts of product mixing must be effected for 10 to 30 minutes in order to work in the honey in small amounts. This is followed by setting aside, which lasts for at least 10 minutes (Example 5) but as a rule for between 24 to 48 hours (Example 1 and others). The intermediate setting aside is followed by the final comminuting process which again takes 15 to 20 minutes. Only then is the production of the products complete. There are total mixing times of 25 to 50 minutes and storage times of customarily one to two days. This practically excludes industrial production if it is understood thereby that industrial operations are to operate hygienically without risks and furthermore very economically from the standpoint of the space, time and apparatus required.

U.S. Pat. No. 3,780,185 describes a non-sticky product containing honey which is produced by mixing a soybean protein isolate with dry milk, sugar and dried honey and drying it. The product is in granular form and can be worked into tablets or bars. U.S. Pat. No. 3,351,472 describes a method of producing a spreadable honey-butter mix. This product consists of 50 to 60% honey solids, 2 to 20% milk solids including 1 to 10% fat selected from among milk fat, animal fat and vegetable fat, 5 to 15% added dextrose and 5 to 15% corn-syrup solids, the total solids content being 68 to 82% and the product being used as honey butter. It is spreadable. This product has the disadvantage that the protein:fat:carbohydrate ratio does not lie within the desired limits and that furthermore it does not keep for a long time.

U.S. Pat. No. 3,950,551 describes a method of producing a food product which consists of dried or crushed flakes and which is obtained by thin-film drying with sugar-containing dehydrated syrup and gelatinized starch and soya protein. As sugar-containing syrup, honey may also be used. The product may also contain vegetable fat, about 3% by weight of vegetable oils giving the desired texture.

U.S. Pat. No. 2,693,420 describes a method of producing a dry honey product which contains honey and gelatinized starch and contains at least about 45 wt% honey solids. According to Claim 7, the product may contain up to about 65 wt% honey solids.

By this process one obtains a product in the form of a cake or lump and the lumps must then be comminuted, pulverized and crushed.

In Examples 3 and 4 of U.S. Pat. No. 3,366,494, a honey-containing product is described. This product contains in addition to honey, also vegetable oil and microcrystalline cellulose as support. The product can be used as aerosol.

A product which contains honey and milk is described by H. Mykola et al in Am.J. Med. Sci. 207, 209-19, 1944 (see Chemical Abstracts, Volume 38, No. 7, April 10, 1944, column 1770/7).

West German Unexamined Application for Patent OS No. 2 705 433, Example 7, describes a product which contains honey and vitamins. In Soviet Pat. No. 2 463 587, a method of treating honey is described in which furthermore the water is separated by lyophilization from the honey.

U.S. Pat. No. 2,947,636 describes a method of producing a dry solid product which can be used to produce foods and which consists of a starch hydrolysate and a protein-containing material. As protein, gelatin, casein, glycinin or some other soya protein, albumin, etc., is used.

All of these known products have the disadvantage that they either can be produced only by a complicated method or that they are perishable or that the protein:-fat:carbohydrate ratio does not lie within the suitable ratio.

The object of the present invention is therefore to provide a food concentrate which is still natural and which has the proper protein-fat-carbohydrate ratio so that it can be used either as food by itself or as equalizing food. The food concentrate of the invention should furthermore contain the additives necessary for an optimum diet, such as vitamins, minerals and trace elements, directed at the specific requirements of supply and balancing. The method of producing the food concentrate of the invention should be capable of being carried out in simple manner and the apparatus and devices necessary for the manufacture should be easily available.

The food concentrate of the invention is suitable for direct consumption as component of and supplement to the daily diet or for special purposes, for instance in sports, in old age and in childhood or upon pregnancy as well as in special diets. In particular, it should keep for a long time without the sensitive components such as protein and vegetable fats decomposing. Furthermore, it should not contain preservatives and should be present in natural form. In addition, it should be in paste form for ease in use so that feeding is assured even in case of difficult conditions (illness or no water available for mixing).

The invention thus concerns a method of producing a biologically high-grade natural food concentrate which is characterized by the fact that honey or honey mixed with other bee products, mineral substances, a protein support having a biological value of more than 90, and a total amount of essential amino acids of at least 50% by weight as high-grade protein product or a mixture of high-grade protein products, as well as possibly roughage and/or carbohydrates are mixed together in such a manner that at least 40 wt% honey, referred to the final product, is contained in the final product obtained.

The invention furthermore concerns a method of producing a biologically high-grade natural food concentrate which is characterized by the fact that honey or honey mixed with other bee products, a vegetable oil having a melting point of less than 15° C. and a proportion of essential fatty acids of more than 50 wt% or a mixture of such vegetable oils, a protein support with a biological value of more than 90, and a total proportion of essential amino acids of at least 50 wt% as high-grade protein product or a mixture of high-grade protein products and possibly mineral additives are mixed together in such a manner that at least 40 wt% honey, referred to the final product, is contained in the final product obtained. This second embodiment of the invention is particularly preferred.

Surprisingly, it has been found that the food concentrates produced in accordance with the invention satisfy all the requirements indicated above and in particular are capable of long storage. Honey serves as preservative since, on the one hand, it acts bacteriostatically and, on the other hand, it prevents air from having access to those products which spoil easily, such as vegetable fat and protein. The final product of the invention is of a viscous pasty character so that it can be packed and marketed in tubes. The viscous consistency of honey is characteristic of the flow properties of the product. The honey surprisingly performs two technical tasks, in that, on the one hand, it sees to the exclusion of air from the mixture and, on the other hand, is controlling for the bacteriostasis and preservation. Since the components are incorporated, possibly with addition of water, into the honey and are present in very finely divided form in it (dissolved, suspended, dispersed, possibly emulsified) and therefore in homogeneous form, it is possible to produce a stable product which keeps for a long time and the taste of which is determined by the honey without any of the customary technical measures such as heating, pasteurization, chemical preservatives, etc. In this way, it is possible not only to transfer into the concentrate the chemically determinable building blocks but also to maintain undamaged and active for a long time the vital substances which are sensitive to chemicals, heat, air and oxygen.

It was also surprising that the product of the invention retains its constitution. If honey is mixed with protein or with fat, particularly liquid vegetable fat such as sunflower oil, one obtains a mixture which separates into two phases upon storage. The product of the invention is stable and no separation into phases takes place.

Any kind of honey can be used in the method of the invention. The honey used in the method of the invention can furthermore also contain other bee products. Honey can, for instance, contain beebread and/or blossom pollen, royal jelly, drone jelly, dispersed beeswax, propolis extract and/or propolis. The honey contains, however, a total of not more than 50 wt% of other bee products, preferably 40 wt% and particularly preferably 15 wt% of other bee product or mixture of bee products referred to the honey. The proportions of the different bee products may be as follows:

beebread and/or blossom pollen up to 50 wt%, preferably 20 to 30 wt%, royal jelly and/or drone jelly up to 15 wt% and preferably 5 to 10 wt%, dispersed beeswax and/or propolis extract up to 10 wt%, and preferably 2 to 8 wt%, and propolis up to 2 wt%, preferably 1 wt%.

In accordance with the invention, a high-grade protein product or a mixture of high-grade protein products is used. The expression high-grade protein product is intended in the present specification also to include a mixture of high-grade protein products. The protein product is a protein carrier which is of high molecular weight, has biological activity, and is sensitive. The biological value is at least 90 and the proportion of essential amino acids in N=16 (100 g protein=100) is more than 50%. Such protein products are highly sensitive to spoilage and sensitive to heating, pasteurization and long standing. Until now there has been practically no possibility of introducing such protein products in natural condition into foods. Examples of protein products are milk albumins and milk globulins, the retentate from ultrafiltration of milk which should be as low as possible in casein, preferably "milk protein without NPN fraction," blood-serum albumins and blood-serum globulins from fresh slaughtering, chicken protein, fresh whole egg, freeze-dried or spray-dried ovoalbumin, ovoglobulin and ovovitellin, extracted yeasts from growth yeasts of saccharomyces, candida, torula, furthermore types of methylophilus, possibly concentrated as hydrolysate, meat juice or fish juice. All these protein products are used in such a form that they satisfy the features indicated. As indicated above these proteins are highly sensitive, spoil rapidly, and are surprisingly preserved and brought into stable condition by the honey. They are utilized by the body with practically no waste.

As mineral substances in the method of the invention, there those generally customary are used. Generally, the mineral substances are in the form of mixtures of individual mineral components. Examples of mineral substances are calcium, sodium and magnesium compounds, particularly the phosphates and trace-element compounds. As mineral additions, there may furthermore be used, for instance, potassium acetate, vegetable ash and other electrolytes. It is of particular interest for the mineral additive to contain potassium, calcium, magnesium, phosphorus, sulfur and chloride, and possibly also sodium. The trace elements are generally in the form of the oxides, carbonates, chlorides, sulfates, acetates, lactates or fumarates and trace elements are, for instance, iron, iodine, calcium, potassium, sodium, cobalt, copper, manganese, molybdenum, selenium and zinc. The man skilled in the art is well-acquainted with the minerals and such pre-mixes are available on the market.

In accordance with the invention, in general polymeric carbohydrates are used as roughage and/or carbohydrates.

As polymeric carbohydrates, there are used carbohydrates which either act as roughage or themselves are of nutrient quality. Celluloses are preferably employed. Of these celluloses, in turn, alpha-cellulose is particularly preferred since it is industrially available. Other preferred carbohydrates are extruded or expanded cereal products or micronized cereal products which are available on the market, for instance swelling flours, extruded starch pre-products for the foodstuff industry, for instance those from wheat, corn, rice, millet and maltodextrins. The man skilled in the art is well-acquainted with such polymeric carbohydrates.

In accordance with the invention there are furthermore used as vegetable oil—the expression "vegetable oil" also including mixtures—preferably sunflower oil, linseed oil and safflower oil. These oils have a high content of essential fatty acids and prevent fat compounds, for instance cholesterol, from depositing in the vessels.

The melting point of these oils is below 15° C., and preferably below 20° C., and the percentage of essential fatty acids is more than 50 wt%, and particularly preferably more than 60 wt%.

The oils used are, in principle, employed as liquid. In general, vegetable oils which are emulsified with lecithin and stabilized are used (tocopheroles=vitamins E with synergists=ascorbic acid, citric acid, etc.). (On the literature of fats see "Industrial Oil and Fat Products," A. E. Bailey, 1951, Interscience Publ. Inc. New York, USA, "The Chemical Constitution of Natural Fats, T. P. Hilditch, 1956, 3rd revised edition, X. Chapman & Hall Ltd., London, Great Britain, "Analyse der Fette und Fettprodukte," [Analysis of Fats and Fat Products], H. P. Kaufmann, Volumes I and II, 1958, first edition, Springer-Verlag, Berlin).

The food concentrates produced in accordance with the invention may, in addition, also contain other additives such as customarily employed in such food concentrates. Examples of such other additives are enzymes, hormones, vitamins, mineral substances, trace substances, coloring substances, flavoring substances, vegetable concentrates of pharmacological action, substances for the prevention of widespread diseases and their mixtures. The product of the invention which contains honey or honey mixed with other bee products, a high-grade protein product or a mixture of high-grade protein products, mineral substances and possible roughage and/or carbohydrates contains these components in the proportions set forth in the following Table I.

TABLE I

Weight percent of the different components (referred to 100 wt % final product) (food concentrate)

|  | General | Preferred | Particularly preferred |
|---|---|---|---|
| honey or honey mixed with other bee products | at least 40 | 45–85 | 50–70 |
| protein product | 5–25 | 5–20 | 5–15 |
| mineral addition | 5–25 | 5–20 | 10–20 |
| ballast | 0–35 | 5–25 | 5–15 |
| furthermore other addition substances (referred to the mixture of food concentrate and addition substance) | 0–5 | 0.5–3 | 2.5–3 |

The food concentrate of the invention which contains honey, protein product, vegetable fat product and mineral additives, contains these components in the quantities indicated in the following Table II.

TABLE II

Weight percent of the different components (referred to 100 wt % of final product) (food concentrate)

|  | General | Preferred | Particularly preferred |
|---|---|---|---|
| honey or honey mixture | at least 40 | 45–85 | 50–70 |
| protein carrier, calculated as raw protein content in the final product | 5–30 | 10–30 | 10–25 |
| vegetable oils | 1–25 | 2–20 | 5–15 |
| mineral additives | 0–10 | 1–8 | 1–5 |
| furthermore other addition substances (referred to the mixture of food concentrate and addition substance) | 0–5 | 1–3 | 2.5–3 |

The food concentrates prepared in accordance with the invention may, as stated above, contain further addition substances. These addition substances may be present in a quantity of up to 5 wt%, referred to the mixture of food concentrate and addition substances. In other words, this means that 95 wt% of the resultant food concentrate and 5 wt% of addition substances can be mixed together. The admixing of the addition substances can take place at any desired time during the preparation of the products.

The products of the invention are produced in a simple manner. Any desired mixers or agitators are employed, into which the honey is introduced and by which the honey can be stirred or sufficiently moved. Such mixers are well known to the man skilled in the art and are described, for instance, also in West German Unexamined Application for Patent . . . (German Patent Application P No. 32 04 367.8 of the present applicant). The honey is first introduced into the mixer. In accordance with the first variant of the process, the mineral substance is then added to the honey and mixed. To the mixture of honey or honey, mixed with other products and mineral substances, there is then added the high-grade protein product or a mixture of high-grade protein products, the stirring being continued. The mixing is complete generally in a very short period of time, for instance, within 3 to 5 minutes. The roughage substances can then possibly also be added to the resultant mixture, the mixing being then continued for an additional few minutes.

In the other variant of the method, the vegetable liquid fat product or a mixture of vegetable liquid fat products is added with stirring to the honey or honey mixed with other bee products. The mineral additives, if any, are then added. The high-grade protein product is then added to this mixture. Stirring is effected for a short time; in this case also the mixing is complete within 3 to 5 minutes. Occasionally it may be necessary to stir for a longer time.

The above-mentioned addition substances can be added, as stated, at any desired time during the production of the product.

In accordance with the invention, it is possible in this way to produce food concentrates which have a protein:fat:carbohydrate ratio such as set forth in the following Table III.

TABLE III

| Type | Carbohydrate | Fat | Crude Protein | /Total |
|---|---|---|---|---|
| Rating in accordance with energy content | | | | |
| A | 4 | 1 | 1 | 6 |
| B | 5 | 1 | 1 | 7 |
| C | 5 | 1 | 2 | 8 |
| D | 5 | 2 | 1 | 8 |
| Conversion of the amounts of energy by % | | | | |
| A | 67.2 | 16.7 | 16.7 | 100 |
| B | 71.4 | 14.3 | 14.3 | 100 |
| C | 62.5 | 12.5 | 25.0 | 100 |
| D | 62.5 | 25.0 | 12.5 | 100 |
| Conversion of the percentages of energy into amounts by weight | | | | |
| A | 16.4 | 1.8 | 4.1 | 22.3 |
| B | 17.4 | 1.5 | 3.5 | 22.4 |
| C | 15.2 | 1.3 | 6.1 | 22.6 |
| D | 15.2 | 2.5 | 3.0 | 20.7 |
| Conversion of the amounts by weight by % | | | | |
| A | 73.5 | 8.1 | 18.4 | 100 |
| B | 77.7 | 6.7 | 15.6 | 100 |
| C | 67.3 | 5.7 | 17.0 | 100 |
| D | 73.4 | 12.0 | 14.6 | 100 |
| minimum | 65 | 5 | 10 | 80 |
| maximum | 80 | 15 | 30 | 125 |

Food concentrate A is suitable as source of energy upon continuous exercise, food concentrate B as food concentrate after continuous exercise, food concentrate C for the building-up of reserves and food concentrate D for body building.

In accordance with the practical experience that above a water content of 17% honey already is subject to the risk of spoilage by fermentation, particularly upon improper handling, and that the law itself establishes a specific maximum water content of 21%, it was not to be expected that further dilution of the honey with other substances which are bacteriologically risky because of their high nutrient value could be harmless.

It has been surprisingly found that the very fine admixing in accordance with the method and the avoidance of air inclusions, as generally possible, by the carrying out of the method, can lead to complete stabilization and preservation. The preliminary tests which were carried out separately with protein or fat carriers showed complete stability but slowly increasing separation. The experiments confirm the analogy also in the case of mineral and trace substances.

Further experiments which were carried out in a combination of protein and fat carriers with honey showed the surprising result that separation processes no longer occur when all three of the nutrient elements, fat, protein and carbohydrate, are present together in the honey and contained in finely divided form therein. It was also surprising that the thus increased risk of instability due to all microorganisms and substances which promote special strains of microorganisms could be still kept absolutely under control.

Even the further increase in the risk by the increasing of the basic nutrient ration with portions by the adding of vitamins, mineral substances and trace substances dissolved in water proved to be absolutely controllable.

The exceptional advantage which was found from the extensive experimental preliminary work was that in this way there had been found a method of preparing such biologically important concentrates that the customary methods of preservation by drying with heat and by preserving with chemicals can be dispensed with.

Accordingly the method makes it possible 1. in any desired manner to combine carbohydrates, essentially as honey, with protein supports, fat supports, vitamins and minerals and trace substances in such a manner that in this way full and supplementary rations which satisfy the requirements can be established;

2. to dispense with all kinds of more or less unnatural or denaturing methods of preservation in order in this way to preserve unaffected and unimpaired the natural properties inherent in the components of the ration; and 3. so to concentrate such mixture of substances and preserve it for a long time that the maximum value is retained unimpaired quantitatively and qualitatively within a small volume and with a low weight until consumption. The product of the invention is sufficient as sole nutrient product and makes possible high performance without loss.

The following examples serve to explain the invention.

EXAMPLE 1

1. Preparation
   1.1 Preparation of the mineral mixture

| | |
   |---|---|
   | potassium acetate | 4.0 kg |
   | calcium phosphate | 6.8 |
   | magnesium phosphate | 8.4 |
   | vegetable ash | 0.8 |

-continued

| | |
|---|---|
| orange juice | 10.0 = 30.0 kg dispersion |
| 1.2 Preparation of the flavor mixture of natural flavor extracts | |
| honey | 0.1 kg |
| vanilla | 0.1 |
| orange | 0.1 |
| cream | 0.06 = 0.36 kg essence |
| 2. Preparation of the Final Product | |
| Mixer, cleaned, disinfected; add | |
| 2.1 Pollen honey (25:75) | 20.0 kg |
| 2.2 Addition of the flavoring substances (1.2) | 0.36 mix briefly (10 secs) |
| 2.3 Add blossom honey | 40.00 mix briefly (3–5 secs) |
| 2.4 Addition of the mineral dispersion | 30.0 mix briefly (2 × 15 sec) |
| 2.5 Add vitamin premix | 0.1 mix briefly (3–5 secs) |
| 2.6 Add fructose solution 70/92 | 10.0 mix briefly (15 secs) |
| 2.7 Add milk protein | 4.0 mix briefly (15 secs) |
| 2.8 Roughage (alpha-cellulose) | 4.0 mix (2 × 3 secs) |
| | 108.46 kg final product |
| remove and introduce into tubes. (Temperature at end of operation: 30–32° C.). | |

EXAMPLE 2

| | |
|---|---|
| 1. Preparation | |
| 1.1 Preparation of the mineral mix with vitamins | |
| potassium acetate | 310 g |
| calcium hydrogen phosphate | 430 g |
| magnesium hydrogen phosphate | 310 g |
| vitamin mix | 80 g = 1130 g |
| disperse with water up to | 6000 g. |
| 1.2 Preparation of the fat mixture with Provitamin A (Beta-carotin) | |
| sunflower oil | 5400 g |
| lecithin | 500 g |
| beta-carotin suspension | 100 g = 6000 g. |
| 2. Preparation of the Final Product | |
| Mixer, cleaned, disinfected | |
| 2.1 pollen honey (25:75) | |
| 2.2 blossom honey | 4.60 g |
| 2.3 addition of the mineral mix (1.1) | 6.0 kg mix briefly (2 × 10 secs) |
| 2.4 addition of the fat mixture (1.2) | 6.0 kg mix briefly (2 × 15 secs) |
| 2.5 addition of lactalbumin from ultrafiltration (pH 5.5–5.6) | 22.0 kg mix briefly (2 × 30 secs) |
| | 100.0 kg |
| remove and place the creamy mass in jars or tubes (temperature 30 to 32° C.). | |
| Contents: | 61% blossom honey |
| | 22% milk protein carrier |
| | 6% oil, sunflower + lecithin + carotin |
| | 5% blossom pollen |
| | abt. 1% mineral addition |
| | abt. 5% water addition (adjustment of consistency) |

The following Tables IV and V contain summaries of experimental recipes.

TABLE IV

| | Test No. | | | |
|---|---|---|---|---|
| Content | 1 | 2 | 3 | 4 |
| | (all figures in % of the final product) | | | |
| honey (blossom, forest) | 56.7 | 56.0 | 44.1 | 70.0 |
| honey and pollen 75:25 | — | — | 14.7 | 10.0 |
| proportion of pollen therein ( ) | — | — | (3.7) | (2.5) |
| whey concentrate/milk concentrate, protein-rich, lactose-poor pulverized | — | — | 14.7 | 10.0 |
| concentrated (49% solids) | 18.9 | 18.9 | — | — |
| mineral additions | 13.3 | 14.0 | 13.9 | 10.0 |
| potassium acetate | (6.3) | (6.3) | (7.3) | (4.0) |
| dicalcium phosphate | (3.7) | (3.7) | (3.7) | (3.5) |
| magnesium phosphate | (3.7) | (3.3) | (2.9) | (2.5) |
| vegetable ash | — | (0.7) | 0.7 | traces |
| flavoring substances | + | + | + | + in the mg range |
| roughage and carbohydrates alpha-cellulose ( ) not calculated. | 11.0 | 11.0 | 9.6 | — |
| | 100 | 100 | 100 | 100 |
| Percentages exactly divided up here into groups of substances | | | | |
| contents in final product chemical solids weight | 77.8 | 77.8 | 80.1 | 82.2 |
| water content (honey/addition) | 22.2 | 22.2 | 19.9 | 17.8 |
| raw protein | 4.2 | 4.2 | 3.3 | 2.2 |
| raw fat | + | + | + | + only traces |
| carbohydrate sugar | 44.1 | 43.4 | 46.7 | 67.5 |
| carbohydrate roughage | 11.0 | 11.0 | 9.6 | — |
| raw ash = mineral | 18.5 | 19.2 | 20.5 | 12.5 |

TABLE V

| | Products | | | | |
|---|---|---|---|---|---|
| Content | A | B | C | D | E |
| Honey | 65.5 | 44.4 | 59.5 | 72 | 67.1 |
| Honey and pollen | — | 14.8 | — | — | — |
| % of pollen therein ( ) | — | (3.7) | — | — | — |
| protein carrier retentate from ultafiltration | 19.2 | 20.6 | 21.0 | 16.9 | 19.9 |
| full egg, fresh | 8.5 | — | — | — | — |
| fat carrier sunflower oil | 4.9 | 13.9 | 13.0 | 11.0 | 10.4 |
| lecithin | 0.2 | 1.2 | 0.8 | — | 2.6 |
| mineral (electrolytes: K—Ca—Mg—(Na)—P—S—Cl) addition total | 1.2 | 1.1 | 1.1 | — | — |
| flavorings/vitamins | + | + | + | + | +(traces, mg range) |
| water (adjust viscosity) | 1.5 | 4.0 | 4.5 | — | 4.8 |
| | 100 | 100 | 100 | 100 | 100 |

The biologically high-grade natural food concentrate of the invention can be used as foodstuff, preliminary product for the production of foodstuffs, and support for drugs and medicines. It is furthermore suitable for elderly people and patients who can only eat a slight amount. It finds extensive use in athletics, for instance in track and mountain climbing, as quick-energy high-efficiency concentrate. The food concentrate of the invention can be packed in tubes and taken from the tube as needed. It can furthermore be introduced into chewable ampules, cans, etc. It is suitable as a bread spread and since it is water soluble it can also be diluted at any time with water and consumed as beverage.

I claim:

1. A method of producing a biologically high grade, storage stable, fluid, natural food concentrate not requiring preservatives for storage stability comprising mixing
- (a) honey or honey mixed with up to 50 weight percent of a bee product selected from the group consisting of drone jelly, royal jelly, propolis, propolis extract, pollen, beebread, beeswax and mixtures thereof in an amount such that the honey concentration in the concentrate is at least 40 weight percent;
- (b) 5 to 25 weight percent mineral additive;
- (c) 5 to 25 weight percent protein containing material having a biological value of more than 90 and a total proportion of essential amino acids of at least 50 weight percent; and
- (d) 0 to 35 weight percent of a material selected from the group consisting of roughage and polymeric carbohydrate and mixtures thereof.

2. A method according to claim 1 in which the honey component (a) is employed in an amount such that the honey concentration of the concentrate is 45 to 80 weight percent, the amount of mineral additive is 5 to 20 weight percent, the amount of protein containing material is 5 to 20 weight percent and the amount of said material is 5 to 25 weight percent.

3. A method according to claim 2 wherein the amount of the honey component (a) is such that the honey concentration is 50 to 70%, the amount of mineral additive is 10 to 20%, the amount of protein containing material is 5 to 15% and the amount of said material is 5 to 15%.

4. A method according to claim 1 in which the mineral additive is mixed with the honey and then the protein containing material is mixed with the mixture of honey and mineral additive.

5. A method according to claim 1 wherein the honey component (a) contain up to 50 weight percent beebread and pollen, up to 15 weight percent royal jelly and drone jelly, up to 10 weight percent beeswax and propolis extract, and up to 2 weight percent propolis.

6. A method of producing a biologically high grade, storage stable, fluid, natural food concentrate not requiring preservatives for storage stability comprising mixing
- (a) honey or honey mixed with up to 50 weight percent of a bee product selected from the group consisting of drone jelly, royal jelly, propolis, propolis extract, pollen, beebread, beeswax and mixtures thereof in an amount such that the honey concentration of the concentrate is at least 40 weight percent;
- (b) 1 to 25 weight percent of vegetable oil having a melting point below 15° C. and a proportion of the essential fatty acids of more than 50 weight percent;
- (c) 5 to 30 weight percent of a protein containing material having a biological value of more than 90 and a total proportion of essential amino acids of at least 50 weight percent; and
- (d) 0 to 10 weight percent mineral additive.

7. A method according to claim 6 in which the honey component (a) is present in an amount such that the honey concentration in the concentrate is 45 to 85 weight percent, the amount of vegetable oil is 2 to 20 weight percent and the percentage of essential fatty acids therein is more than 60 weight percent, and the amount of protein containing material is 10 to 30 weight percent, and the amount of mineral additive is 1 to 8 weight percent.

8. A method as claimed in claim 7 in which the amount of honey component (a) is such that the honey concentration of the concentrate is 50 to 70 weight percent, the amount of vegetable oil is 5 to 15 weight percent, the amount of protein containing material is 10 to 25% and the amount of mineral additive is 1 to 5 weight percent.

9. A method according to claim 6 in which the vegetable oil is mixed with the honey and thereafter the protein containing material is mixed with the mixture of vegetable oil and honey component.

10. A method as claimed in claim 6 in which the honey component (a) contains up to 50 weight percent beebread and pollen, up to 15 weight percent royal jelly and drone jelly, up to 10 weight percent beeswax and propolis extract, and up to 2 weight percent propolis.

11. A biologically high grade, storage stable, fluid natural food concentrate not requiring preservatives for storage stability comprising
- (a) honey or honey mixed with up to 50 weight percent of a bee product selected from the group consisting of drone jelly, royal jelly, propolis, propolis extract, pollen, beebread, beeswax and mixtures thereof in an amount such that the honey concentration in the concentrate is at least 40 weight percent;
- (b) 5 to 25 weight percent mineral additive;
- (c) 5 to 25 weight percent protein containing material having a biological value or more than 90 and a total proportion of essential amino acids of at least 50 weight percent; and
- (d) 0 to 35 weight percent of a material selected from the group consisting of roughage and polymeric carbohydrate and mixtures thereof.

12. A concentrate according to claim 11 in which the honey component (a) is present in an amount such that the honey concentration of the concentrate is 45 to 80 weight percent, the amount of mineral additive is 5 to 20 weight percent, the amount of protein containing material is 5 to 20 weight percent and the amount of said material is 5 to 25 weight percent.

13. A concentrate according to claim 12 wherein the amount of the honey component (a) is such that the honey concentration in the concentrate is 50 to 70%, the amount of mineral additive is 10 to 20%, the amount of protein containing material is 5 to 15% and the amount of said material is 5 to 15%.

14. A concentrate according to claim 11 in which the honey component (a) contains up to 50 weight percent beebread and pollen, up to 15 weight percent royal jelly and done jelly, up to 10 weight percent beeswax and propolis extract, and up to 2 weight percent propolis.

15. A biologically high grade, storage stable, fluid, natural food concentrate not requiring preservatives for storage stability comprising
- (a) honey or honey mixed with up to 50 weight percent of a bee product selected from the group consisting of drone jelly, royal jelly, propolis, propolis extract, pollen, beebread, beeswax and mixtures thereof in an amount such that the honey concentration of the concentrate is at least 40 weight percent;
- (b) 1 to 25 weight percent of vegetable oil having a melting point below 15° C. and a proportion of essential fatty acids of more than 50 weight percent;
- (c) 5 to 30 weight percent of a protein containing material having a biological value of more than 90 and a total proportion of essential amino acids of at least 50 weight percent; and (d) 0 to 10 weight percent mineral additive.

16. A concentrate according to claim 15 in which the honey component (a) is present in an amount such that the honey concentration in the concentrate is 45 to 85 weight percent, the amount of vegetable oil is 2 to 20 weight percent and the percentage of essential fatty acids is more than 60 weight percent, the amount of protein containing material is 10 to 30 weight percent, and the amount of mineral additive is 1 to 8 weight percent.

17. A concentrate according to claim 10 in which the honey component (a) is present in an amount such that the honey concentration of the concentrate is 50 to 70 weight percent, the amount of vegetable oil is 5 to 15 weight percent, the amount of protein containing material is 10 to 25% and the amount of mineral additive is 1 to 5 weight percent.

18. A concentrate as claimed in claim 15 in which the honey component (a) contains up to 50 weight percent beebread and pollen, up to 15 weight percent royal jelly and drone jelly, up to 10 weight percent beeswax and propolis extract, and up to 2 weight percent propolis.

* * * * *